(12) United States Patent
Holm et al.

(10) Patent No.: US 8,812,948 B2
(45) Date of Patent: *Aug. 19, 2014

(54) SYSTEMS AND METHODS FOR AUTOMATIC SUBMISSION OF FORMS FOR WEB-BASED LEGAL WORKFLOW SOFTWARE

(71) Applicant: AppFolio, Inc., Goleta, CA (US)

(72) Inventors: Eirik Holm, Goleta, CA (US); Comron Sattari, Chicago, IL (US); Tushar Ranka, Goleta, CA (US); Jonathan Walker, Santa Barbara, CA (US)

(73) Assignee: AppFolio, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,635

(22) Filed: May 24, 2013

(65) Prior Publication Data

US 2013/0262570 A1    Oct. 3, 2013

Related U.S. Application Data

(63) Continuation of application No. 12/127,580, filed on May 27, 2008, now Pat. No. 8,453,047.

(51) Int. Cl.
  *G06F 17/20* (2006.01)
  *G06F 15/173* (2006.01)
  *G06F 17/24* (2006.01)
  *H04L 29/08* (2006.01)

(52) U.S. Cl.
  CPC .................. *H04L 67/02* (2013.01); *G06F 17/243* (2013.01)
  USPC ............................. 715/224; 709/224; 715/221

(58) Field of Classification Search
  CPC .......................... H04L 67/02; G06F 17/243
  USPC ................... 709/224; 715/221, 224, 234, 771
  See application file for complete search history.

(56) References Cited

U.S. PATENT DOCUMENTS

| | | | |
|---|---|---|---|
| 6,370,552 B1 | 4/2002 | Bloomfield | |
| 7,461,348 B2 * | 12/2008 | Clow et al. | 715/767 |
| 2002/0113810 A1 | 8/2002 | Radtke et al. | |
| 2003/0231218 A1 | 12/2003 | Amadio | |
| 2007/0239604 A1 | 10/2007 | O'Connell et al. | |
| 2007/0282788 A1 | 12/2007 | Lamb et al. | |
| 2008/0104500 A1 | 5/2008 | Chalemin et al. | |
| 2008/0215976 A1 | 9/2008 | Bierner et al. | |
| 2008/0301573 A1 | 12/2008 | Chi | |
| 2009/0037253 A1 | 2/2009 | Davidow et al. | |

OTHER PUBLICATIONS

Notice of Allowance on U.S. Appl. No. 12/127,580 dated Jan. 25, 2013.
Office Action on U.S. Appl. No. 12/127,580 dated Oct. 6, 2011.
Office Action on U.S. Appl. No. 12/127,580 dated Feb. 15, 2012.
Office Action on U.S. Appl. No. 12/127,580 dated Feb. 2, 2010.
Office Action on U.S. Appl. No. 12/127,580 dated Aug. 17, 2010.

* cited by examiner

*Primary Examiner* — Aaron Strange
(74) *Attorney, Agent, or Firm* — John D. Lanza; Foley & Lardner LLP

(57) ABSTRACT

Systems and methods for automatically submitting data entered into a web page in the event the user shifts focus away from the form may include displaying a web page to a user, the web page containing a form; receiving, from the user, at least some input corresponding to the form; detecting that the form has lost user focus; and submitting, in response to the detection, the form.

20 Claims, 12 Drawing Sheets

Desktop 800

Web browser 801

802

Property Management
New tenant workflow
step 1 of 5

----- DISCOUNT CARPETING! -----

Lease & Move In > Tenant

Profile Information

Name
Salutation  First  Last

Address
Street Address
City  State  Zip Code

Phone
Location  Number

Email
Email Address

Social Security Number
SSN

Move-in Date  04/01/2008   803

805
Save and Continue

*Fig. 8*

SYSTEMS AND METHODS FOR AUTOMATIC SUBMISSION OF FORMS FOR WEB-BASED LEGAL WORKFLOW SOFTWARE

CROSS REFERENCE TO RELATED APPLICATIONS

The present application claims priority to U.S. patent application Ser. No. 12/127,580, filed May 27, 2008, and titled "Systems and Methods for Automatic Submission of Forms on a Web Page," which issued May 28, 2013, as U.S. Pat. No. 8,453,047, the content of which is incorporated herein by reference in its entirety.

FIELD OF THE INVENTION

The present invention relates to computer software and network applications, and, more specifically, web pages having forms which accept user input.

BACKGROUND OF THE INVENTION

Workflow software and services are common in many industries. Workflow software may be used to accomplish or aid in several occupational or industry specific tasks. Workflow software may include any software that performs or aids in accomplishing a discrete job-related task. Examples of workflow software may include inventory management software, personnel tracking software, accounting software, enterprise resource planning (ERP) software and trip or event planning software. Workflow software often is customized for a given industry or occupation to provide optimal functionality. For example, a workflow designed for a health care provider may have built-in functions for handling health insurance payments, or complying with government regulations.

Workflow software may be provided on a hosted basis, where the workflows and associated data are hosted by a third party and accessed through one or more web sites. The web pages containing the workflows and associated reports often contain forms for users to input information. Some of these forms may require large amounts of information, or several unique pieces of information. As a user is entering data into web forms, a user may risk losing previously entered information if the user closes the web browser or navigates away from the form. This information loss may cost valuable worker time.

BRIEF SUMMARY OF THE INVENTION

The present invention addresses the potential for lost form data by automatically submitting data a user has entered in a form as soon as an event is detected which indicates a user has stopped or paused entering data.

In one aspect, the present invention relates to a method for automatically submitting data entered into a web page in the event a user shifts focus away from the form. In one embodiment, a method includes displaying a web page to a user, the web page containing a form; receiving, from the user, at least some input corresponding to the form; detecting that the form has lost user focus; and submitting, in response to the detection, the form. The method may also include displaying, in response to a subsequent request for the web page containing the form, the form and the at least some input.

In another aspect, the present invention relates to a computer system for automatically submitting data entered into a web page in the event the user shifts focus away from the form. In one embodiment, a system comprises: a display which displays a web page to a user, the web page containing a form; an input device, which receives, from the user, at least some input corresponding to the form; a processor, in communication with the display and the input device, which detects that the form has lost user focus; and a transmitter which submits, in response to the detection, the form.

BRIEF DESCRIPTION OF THE DRAWINGS

The foregoing and other objects, aspects, features, and advantages of the invention will become more apparent and better understood by referring to the following description taken in conjunction with the accompanying drawings, in which:

FIG. 8 is a block diagram of an example workflow step with input data; and

DETAILED DESCRIPTION OF THE INVENTION

Figure 1A:
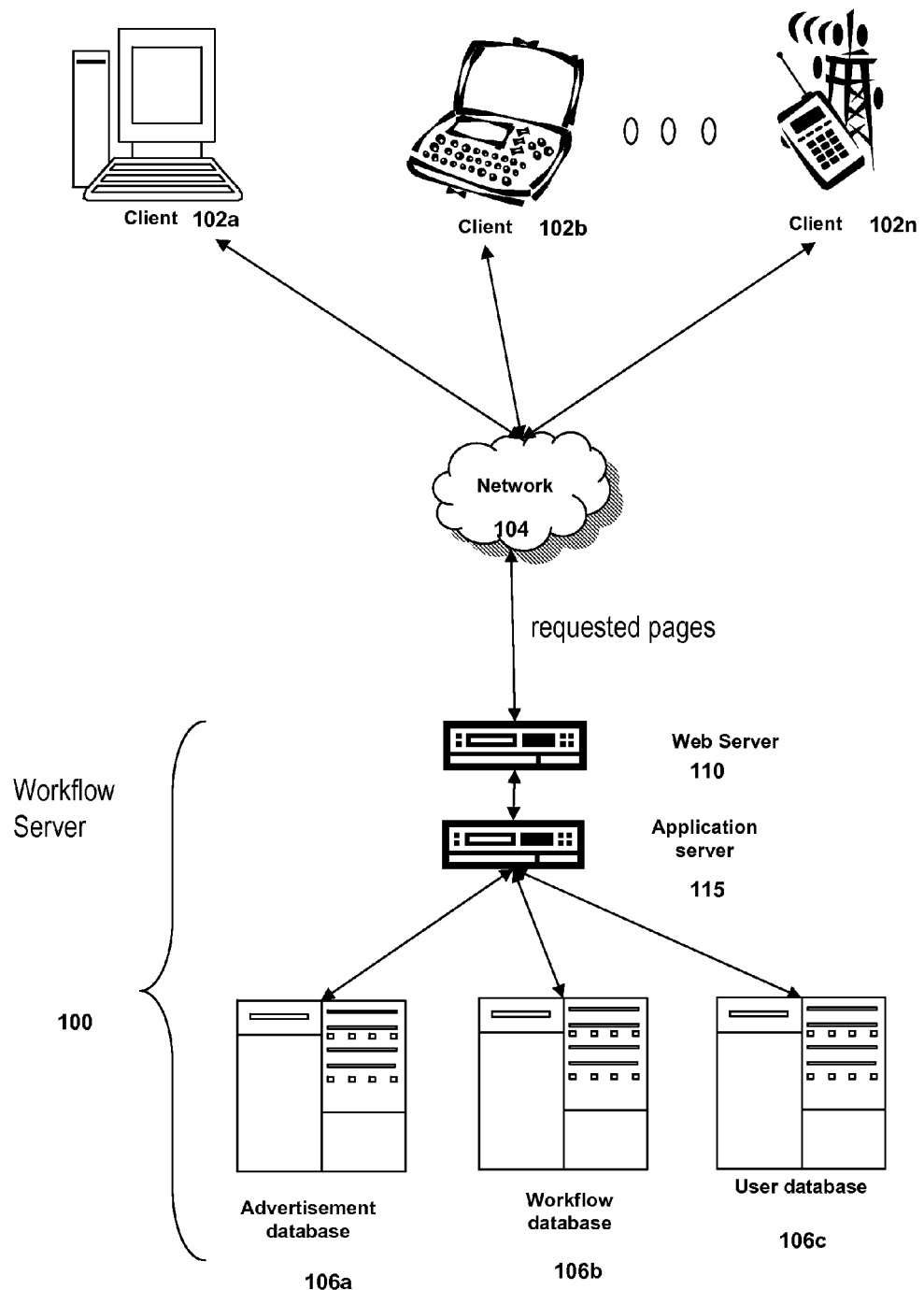
FIG. 1A is a block diagram of one embodiment of a system for deploying workflows to computer users.

Referring now to FIG. 1A, a block diagram of one embodiment of a system for deploying workflows to computer users is shown. In brief overview, a number of clients, 102a, 102b, . . . 102n (generally 102), are connected via a network 104 to a workflow server 100. The workflow server 100 may comprise a number of elements including a web server 110, an application server 115, and a number of databases including an advertisement database 106a, a workflow database 106b, and a user database 106c.

In some embodiments, some or all of the workflow server elements may occupy the same physical machine, and may share any resources, including processors, memory, and communication links. In other embodiments, a workflow server element may be distributed across multiple scalable, fault-tolerant, redundant machines. In some embodiments, these machines may be geographically distributed across a number of sites.

Still referring to FIG. 1A, now in greater detail, a number of clients 102 are shown. A client may comprise any computing device capable of sending or receiving information. Examples of clients 102 may include personal computers, laptop computers, desktop computers, personal digital assistants, and mobile phones. A client 102 may include a display device, such as a monitor or screen, for displaying a received workflow to a user, and an input device, such as a keyboard or mouse, for accepting input of data corresponding to the workflow.

As shown, the clients 102 are connected to a workflow server 100 via a network 104. The network 104 may comprise the Internet, local networks, web servers, file servers, routers, load balancers, databases, computers, servers, network appliances, or any other computing devices capable of sending and receiving information. The network 104 may comprise computing devices connected via cables, IR ports, wireless signals, or any other means of connecting multiple computing devices. The network and any devices connected to the networks may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, POP, IMAP, Ethernet, ARCNET, Fiber Distributed Data Interface (FDDI), RS232, IEEE 802.11, IEEE 802.11a, IEE 802.11b, IEEE 802.11g and direct asynchronous connections, or any combination thereof. The network 104 may comprise mobile telephone networks utilizing any protocol or protocols used to communicate among mobile devices, including AMPS, TDMA, CDMA, GSM, GPRS or UMTS. The network may comprise a plurality of physically distinct networks, and the network may comprise a plurality of sub-networks connected in any manner.

A workflow server 100 may comprise any server or servers capable of sending and receiving data. A workflow server 100 may perform any function related to the delivery and processing of workflows, including without limitation serving web pages corresponding to workflow steps, receiving and processing web page input, storing user, advertiser, and workflow information, and contacting and transacting with external resources. In one embodiment, a workflow server 100 may be implemented using an application server model, wherein a web server 110 handles web requests from clients and serves pages, an application server 115 coordinates workflow logic, and a number of databases 106 manage data, including without limitation user data, workflow data, and advertiser data. In another embodiment, a workflow server may be implemented using a distributed, scalable, fault-tolerant, redundant server architecture.

Figure 1B:
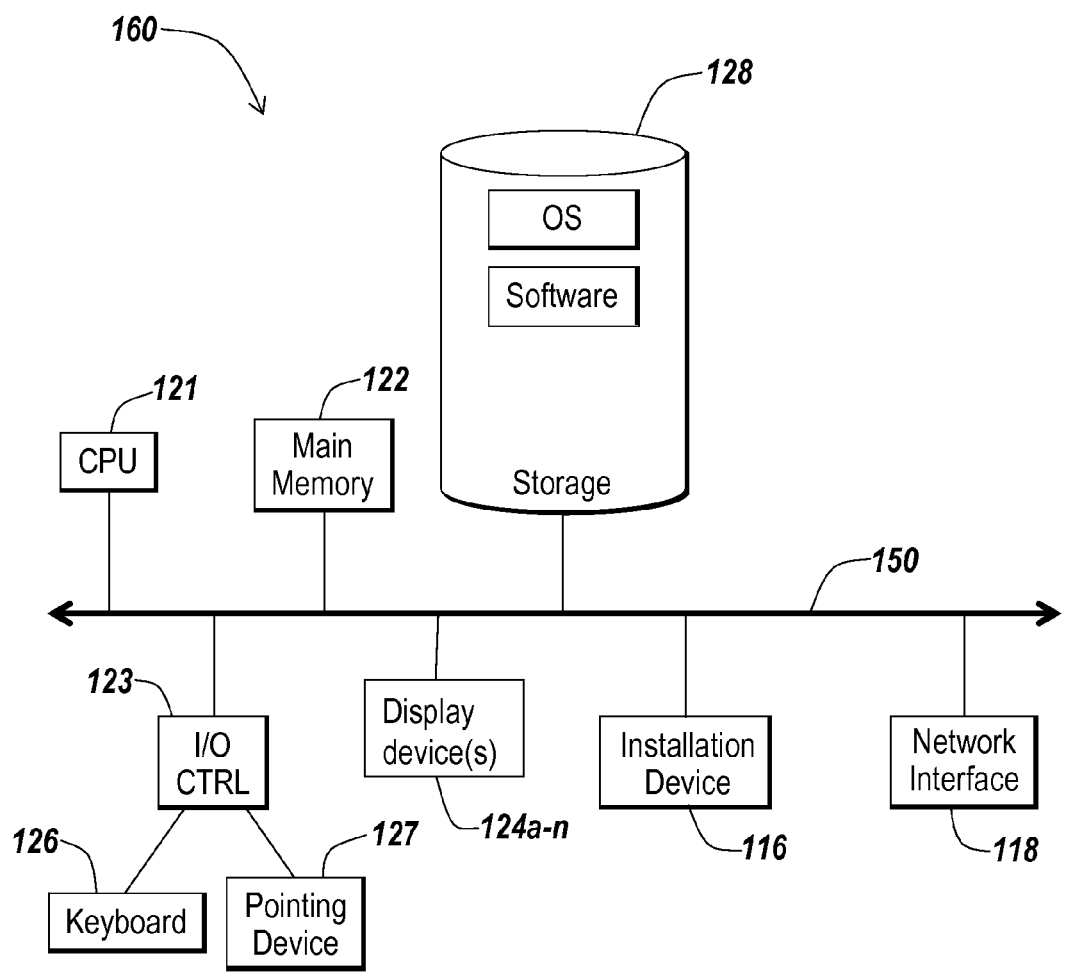
FIGS. 1B and 1C are block diagrams of example computing devices.
Figure 1C:
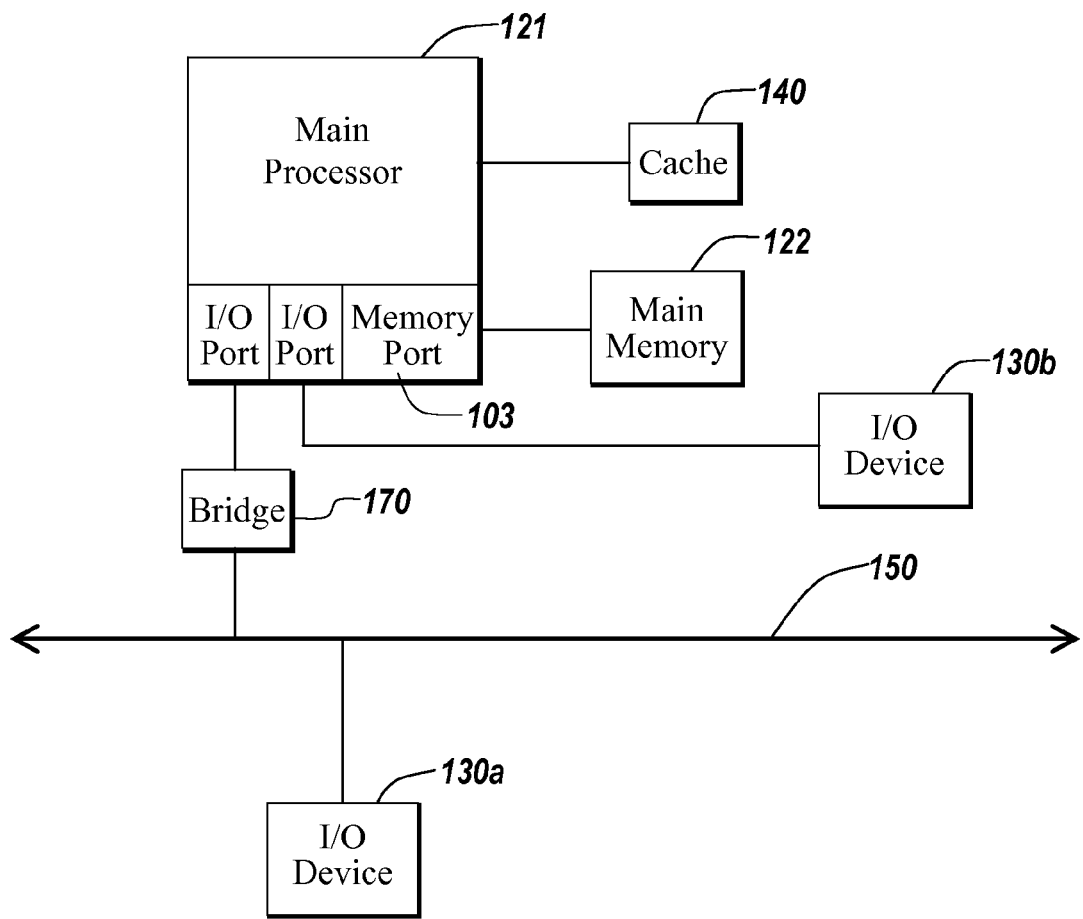

A client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 160 useful for practicing an embodiment of the client 102 or a server 106. As shown in FIGS. 1B and 1C, each computing device 160 includes a central processing unit 121, and a main memory unit 122. As shown in FIG. 1B, a computing device 160 may include a visual display device 124, a keyboard 126 and/or a pointing device 127, such as a mouse. As shown in FIG. 1C, each computing device 160 may also include additional optional elements, such as one or more input/output devices 130a-130b (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 160 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 160 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HyperTransport, Rapid I/O, or InfiniBand. FIG. 1C also depicts an embodiment in which local busses and direct communication are mixed: the processor 121 communicates with I/O device 130a using a local interconnect bus while communicating with I/O device 130b directly.

The computing device 160 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs or portions thereof. The computing device 160 may further comprise a storage device, such as one or more hard disk drives or redundant arrays of independent disks, Flash memory, or EEPROMs, for storing an operating system and other related software, and for storing application software programs. Optionally, any of the installation devices 116 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 160 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET, ADSL, SDSL), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 160 communicates with other computing devices 160' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 160 to any type of network capable of communication and performing the operations described herein.

A wide variety of I/O devices 130a-130b may be present in the computing device 160. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 160. In still other embodiments, the computing device 160 may provide USB connections to receive handheld USB storage devices such as the USB Flash Drive line of devices manufactured by Twintech Industry, Inc. of Los Alamitos, Calif.

In some embodiments, the computing device 160 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 160. For example, the computing device 160 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 160 may include multiple video adapters, with each video adapter connected to one or more of the display devices 124a-124n. In some embodiments, any portion of the operating system of the computing device 160 may be configured for using multiple displays 124a-124n. In other embodiments, one or more of the display devices 124a-124n may be provided by one or more other computing devices, such as computing devices 100a and 100b connected to the computing device 160, for example, via a network. These embodiments may include any type of software designed and constructed to use another computer's display device as a second display device 124a for the computing device 160. One ordinarily skilled in the art will recognize and appreciate the various ways and embodiments that a computing device 160 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 160 of the sort depicted in FIGS. 1B and 1C typically operates under the control of operating systems, which control scheduling of tasks and access to system resources. The computing device 160 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, an open source operating system distributed by, among others, Red Hat, Inc., or any type and/or form of a Unix operating system, among others.

The computer system 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

Figure 2A:
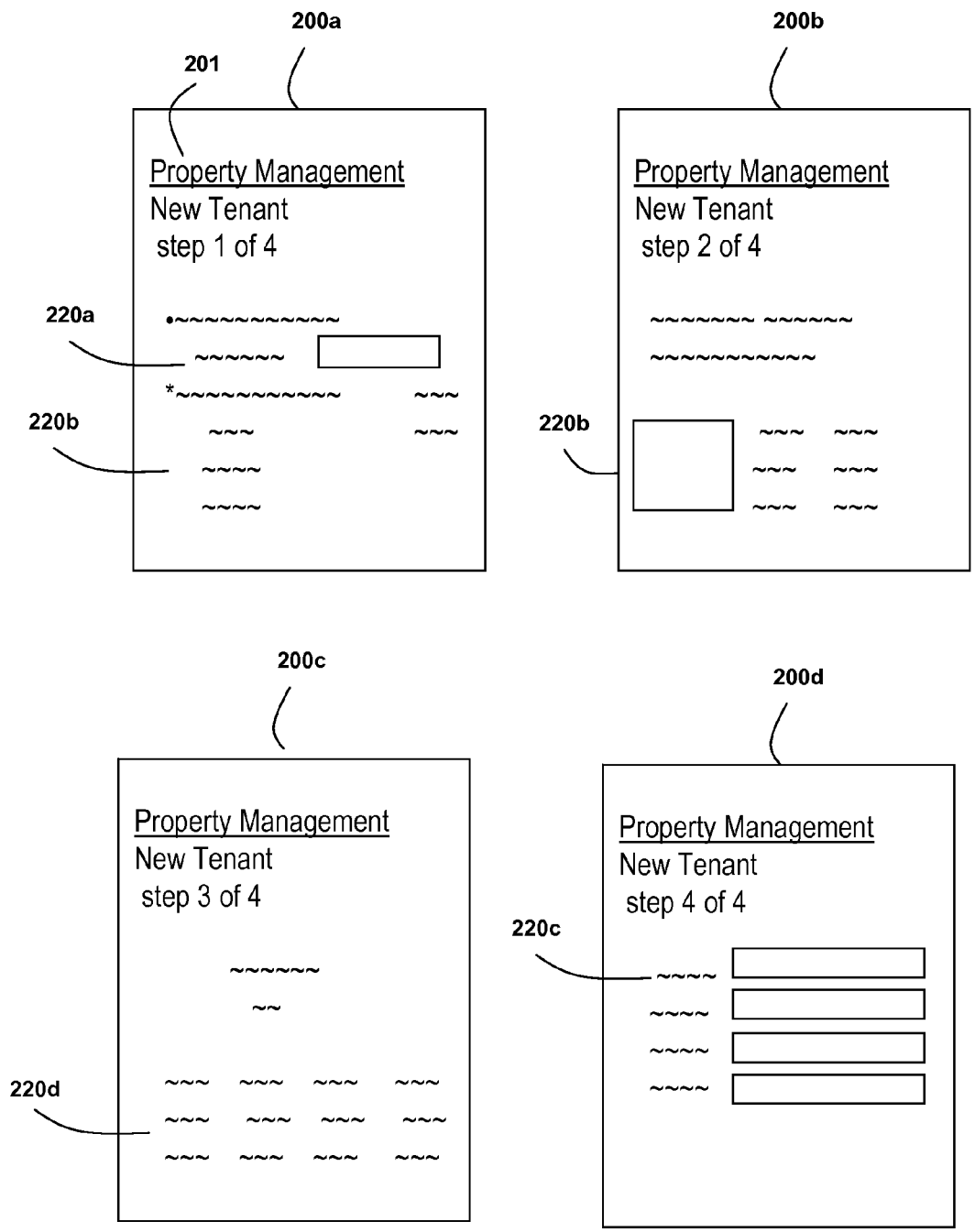
FIG. 2A is a block diagram of one example of a workflow.

Referring now to FIG. 2A, a block diagram of one example of a workflow is shown. In brief overview, the example workflow comprises a plurality of steps 200a, 200b, 200c, 200d (generally 200). The steps may comprise one or more components 220, which may comprise input components, text, images, animations, advertisements, and any other input/output means.

Still referring to FIG. 2A, now in greater detail, a workflow may comprise any series of components which allow a user to manage or complete a given task or situation. One example of a workflow might be a series of components which allow a property manager to handle the functions associated with a recent vacancy, such as scheduling a cleaning, returning deposits, and advertising for a new tenant. Another example of a workflow might be a series of components which allow an event planner to perform tasks associated with managing a new event, such as ordering food and drinks, scheduling staff, reserving space, and printing invitations.

A workflow may comprise any input/output components. In one embodiment, a workflow may comprise a series of HTML pages. In other embodiments, a workflow may comprise a series of pages in any markup language. A workflow may include any input means including text fields, buttons, radio buttons, checkboxes, menus, pull-down menus, and sliders. A workflow may include any means for creating dynamic user interactions, including without limitation scripts, Flash, Java applets, Ajax, Microsoft Silverlight, and Adobe Air.

In some embodiments, a workflow may be specifically adapted for a given industry or market niche. For example, a workflow may be adapted specifically to property management functions. Or, for example, a workflow may be specifically adapted to veterinary services management. Other examples of industries and services which workflows may be adapted for include, without limitation property management, heath care studios, beauty salons, yoga studios, martial arts studios, contracting, roofing, plumbing, law, accounting, restaurants, hotels and motels, bed and breakfasts, storage, limousines, gardeners, tree services, veterinary services, chiropractics, dentists, water delivery, carpet cleaners, window cleaners, house cleaners, wedding planners, photographers, temp services, auto repair, auto parts, shipping, inventory/warehousing, construction and travel agencies. In other embodiments, a workflow may be customized for a given role. For example, a workflow may be customized for an accounts receivable supervisor, regardless of industry. In still other embodiments, a workflow may be customized for a given role within a given industry. For example, a workflow may be customized for a human resources director of a law firm, or a human resources manager of a legal staffing agency.

Figure 2B:
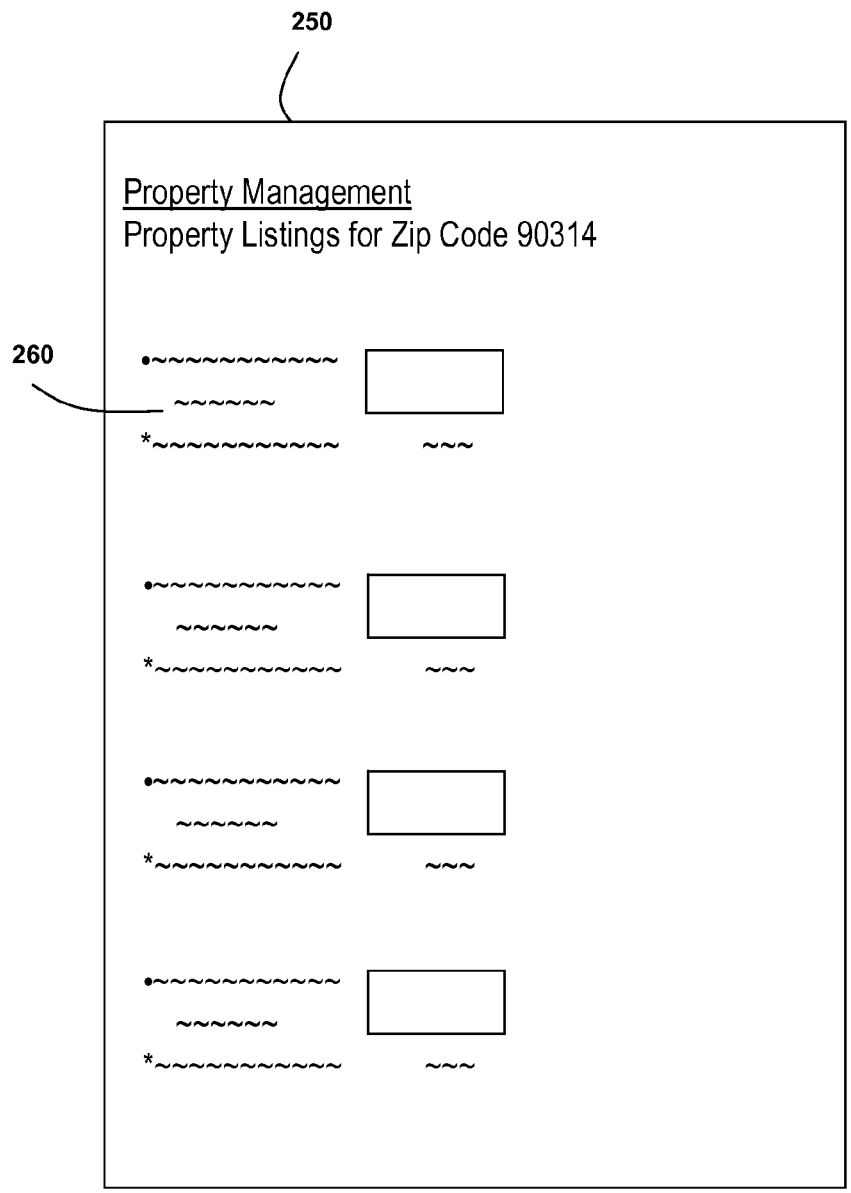
FIG. 2B is a block diagram of one example of a workflow report.

Referring now to FIG. 2B, a block diagram of an example workflow report is shown. In brief overview, a workflow report 250 may include any arrangement of data 260 corresponding to one or more workflows. In the example shown, the report contains a listing of properties within a given zip code that are managed by the user. A report 250 may include any data types, including without limitation text, graphics, photos, audio files, and video files.

Still referring to FIG. 2B, now in greater detail, a workflow report 250 may be generated by a workflow server 100. A workflow report 250 may be based on any data corresponding to a workflow, including both data input through the workflow and data received from other sources. These other sources may include, without limitation, data from other databases, data from the internet, and data migrated from previous workflow software. A workflow report 250 may be presented to a user via a web interface. For example, a web page may be provided on which a user may specify a number of search parameters for properties managed by the user. A web page may then be displayed containing the workflow report 250 of the properties matching the specified search parameters.

In some embodiments, users may be able to design custom reports, including without limitation specifying the formatting and data to appear in a report. For example, a property manager might specify that they would like a report of all properties with rent at least 5 days late, and to display the address, phone number, and total rent paid to date from the tenant.

Figure 3:
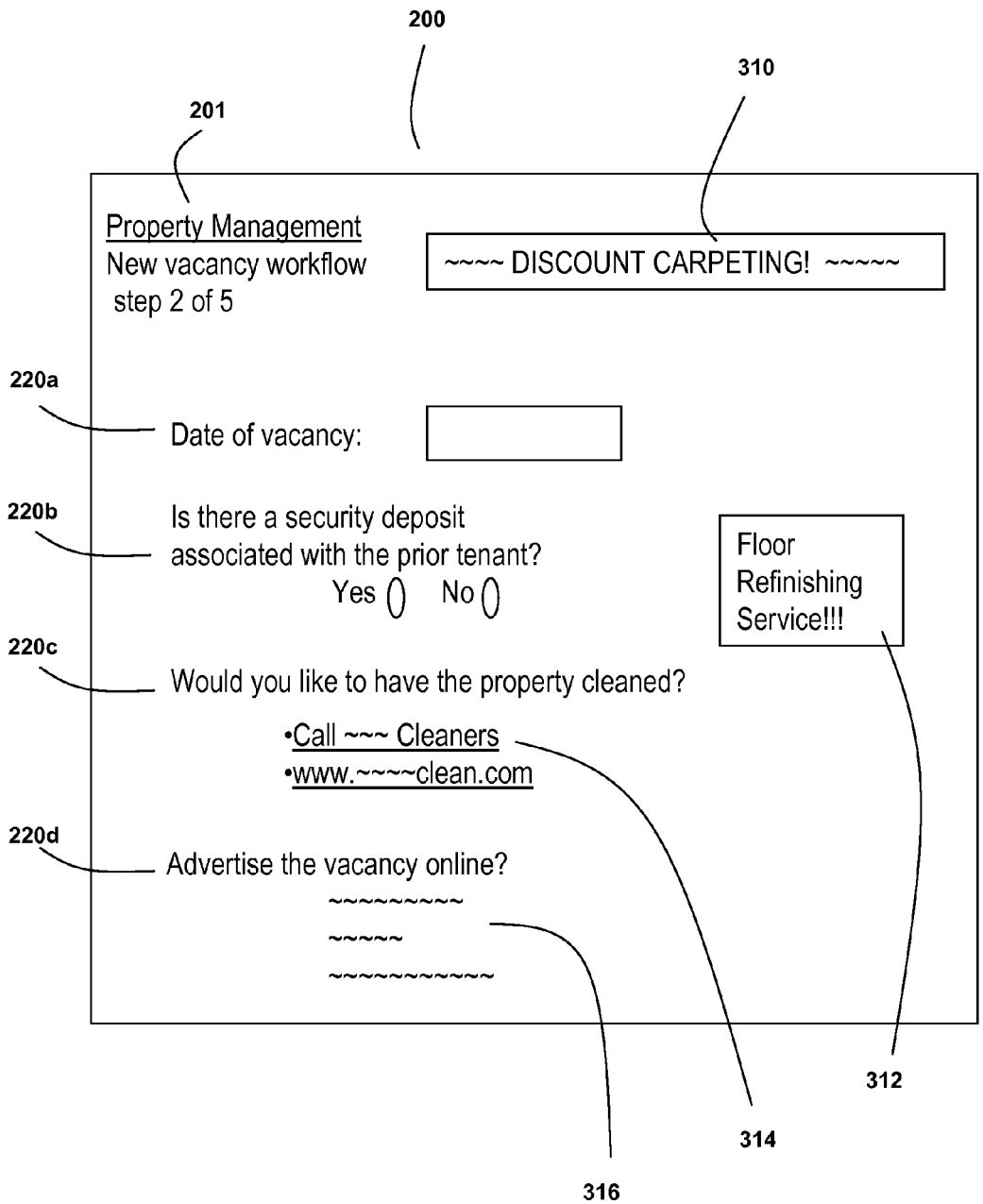
FIG. 3 is a block diagram of an example workflow step with targeted advertising.

Referring now to FIG. 3, a block diagram of an example workflow step with targeted advertising is shown. In brief overview, a workflow step 200 comprises an indication of the workflow step 201, and a number of components 220*a*, 220*b*, 220*c*, 220*d*. The step also comprises a number of advertisements 310, 312, 314, 316, which may be integrated with the workflow components to varying degrees.

Still referring to FIG. 3, now in greater detail, an example workflow step comprises an indicator 201 informing the user of the workflow, and the current step in the workflow being displayed. In the example shown, the workflow step 200 is the second step in a workflow created for property managers to manage new vacancies. An indicator 201 may notify the user of the industry, role, or occupation corresponding to the workflow. In some embodiments, an indicator 201 may comprise a notification informing the user of how many times a particular workflow has been completed. In some embodiments, an indicator 201 may not be displayed.

The example workflow step 200 comprises a number of components 220*a*, 220*b*, 220*c*, 220*d* (generally 220). A component 220 may comprise any input and output grouping that enables a user to complete or specify information corresponding to a discrete task or item. In addition to the examples shown, example components may comprise an order component, a purchase component, an address entry component, a login component, a calendar entry, a chart, a ledger entry, and a general input or question component.

The example workflow step 200 comprises a number of advertisements. An advertisement in a workflow may comprise any form of advertising used in conjunction with web pages or other computer displays. Advertisements in workflows may comprise text, links, images, graphics, sounds, animations, movies. Advertisements in workflows may also comprise interactive components. For example an advertisement for a cleaning service might prompt a user to enter an address to locate a franchise of the cleaning service near a given property. Or for example, an advertisement may be a click-to-call advertisement, wherein clicking the ad places a phone call to the advertiser via the computer displaying the workflow. In other embodiments, an advertisement may comprise any other means for contacting the advertiser, including electronic mail, fax, SMS, instant messaging, and chat functionality.

In one embodiment, advertisements may be displayed as banner advertisements 310. Banner advertisements 310 may be displayed a the top or bottom, along a side, or in the middle of a workflow step. In some embodiments, banner advertisements 310 may be selected for display based on a correlation between the advertisement and the content of a workflow, a workflow step, or a component within a workflow step.

An advertisement 312 may be displayed in proximity to or otherwise associated with a workflow component. For example, the advertisement may be displayed as a textbox near the component. Or, for example, the advertisement may be a pop-up window displayed near the component. In some embodiments, a component-associated advertisement 312 may be selected for display based on a correlation between the advertisement and the content of a workflow, a workflow step, or a component within a workflow step. In one embodiment, an advertisement may take the form of a tip or guide with respect to the workflow step or component.

An advertisement 314 may also be integrated with a component itself. In the embodiment shown, an advertisement for a cleaning service 314 is displayed as an option within a component 220c relating to property cleaning Advertisements may be integrated with components in any way, including, without limitation, as menu options, subquestions, images, popup text, rollover text, related links, and tips.

An advertisement 316 may also be displayed as a self-contained component. An advertisement may be displayed in a substantially similar manner to other non-advertising components, in such a way that the advertisement has the appearance of being an additional workflow item. For example, in the embodiment shown, the "advertise the vacancy online" component 316 may comprise an advertisement for a given online listing service, which may pay a fee to the publisher of the workflow software to have the "advertise online" question included in the workflow, along with a link to the online listing service.

In some embodiments, advertisements displayed within a workflow may add value to the workflow user experience. Targeted advertisements may provide users with access to products, services, and information otherwise unavailable in workflow software. In some embodiments, an advertisement may be chosen to be displayed in a substantially similar manner to other non-advertising components as a result of the advertisement offering additional value to the workflow user. For example, if a workflow server determines that a significant number of users of an event planning workflow respond to an advertisement for an event security provider, the event security provider's advertisement may be displayed similarly to other components in the event planning workflow to reflect the frequent use and value added.

Figure 4:
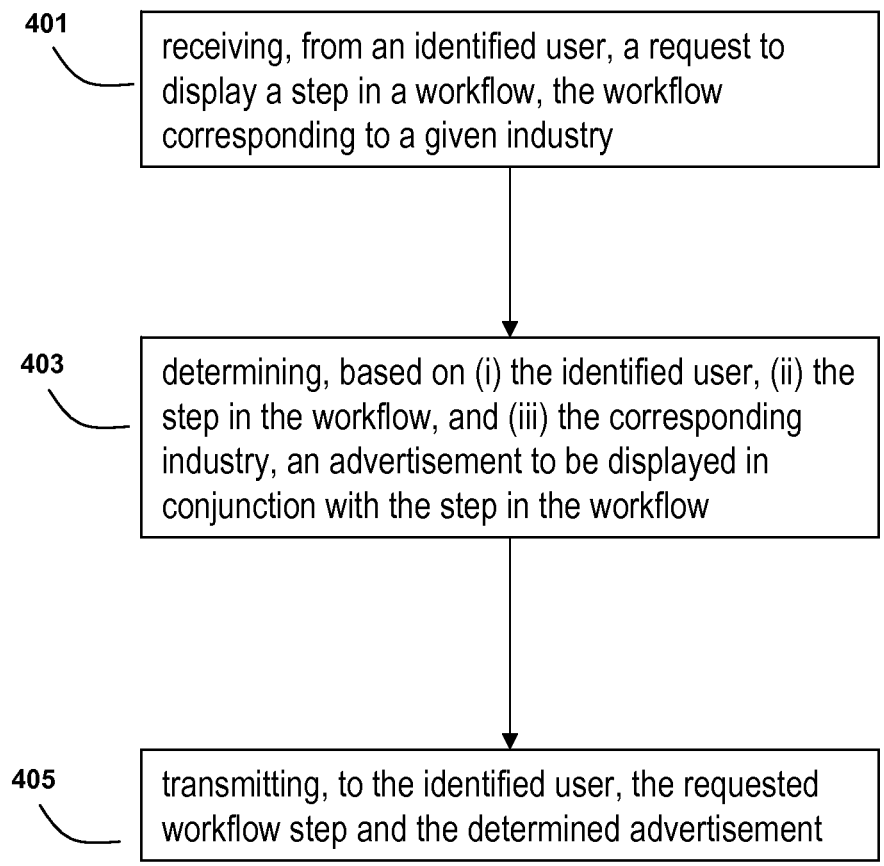
FIG. 4 is a method for displaying targeted advertisements to users of workflow software.

Referring now to FIG. 4, a flow diagram of a method for displaying targeted advertisements to users of workflow software is shown. In brief overview, the method comprises: receiving, from an identified user, a request to display a step in a workflow, the workflow corresponding to a given industry (step 401); determining, based on (i) the identified user, (ii) the step in the workflow, and (iii) the corresponding industry, an advertisement to be displayed in conjunction with the step in the workflow (step 403); and transmitting, to the identified user, the requested workflow step and the determined advertisement (step 405). In the description below, the method will be described in the context of being performed by a workflow server. In other embodiments, the method may be performed by any software and computing device, including workflow software executing on a client.

Still referring to FIG. 4, now in greater detail, a method for displaying targeted advertisements comprises receiving, from an identified user, a request to display a step in a workflow, the workflow corresponding to a given industry (step 401). In some embodiments, the user may be identified via a logon. In other embodiments, a user may be identified by an internet address the user is connecting from. In still other embodiments, the user may be identified by information provided in a previous workflow step.

In some embodiments, the request to display a step in a workflow may comprise an HTTP request from a client. In one embodiment, a client may request to display a step in a workflow by requesting the first step of a workflow in a workflow selection screen. In another embodiment, a client may request to display a step in a workflow by selecting a "next" or "continue" component on a workflow step, which then transmits a request to display the next step in the current workflow.

In some embodiments, a workflow server may determine, based on information in a client request, which step of a workflow to display. For example, in a property management workflow, the workflow server may determine whether to display a property tax payment step based on the location the user has entered for the property and the current time of the year. Or, for example, if a user has indicated on a previous step that a security deposit was not required for a given property, the workflow server may determine not to display a workflow step corresponding to returning a security deposit, and move to a third step in the workflow.

After receiving, from an identified user, a request to display a step in a workflow, the workflow corresponding to a given industry (step 401), a workflow server 100 may then determine, based on (i) the identified user, (ii) the step in the workflow, and (iii) the corresponding industry, an advertisement to be displayed in conjunction with the step in the workflow (step 403). In some embodiments, a workflow server may access data contained in an advertisement and user database in making the determination.

In some embodiments, a workflow server may maintain an advertising history with respect to a given workflow, a given industry corresponding to the workflow, and any users of the given workflow. A workflow server may use the advertising history to successively target an advertisement to an area generating the highest response for the advertisement. This successive targeting may be done with respect to an industry, the workflow, a step in a workflow, a component in a workflow, a user, or an occupational role of a user. For example, an advertisement for a paper goods outlet may be displayed in a number of workflows. In some embodiments, a random factor may be used to determine the initial workflows and workflow steps in which the advertisement will be displayed. The workflow server may then determine that the advertisement generates the most responses when displayed in conjunction with an event planning workflow. The workflow server may then further determine that the advertisement generates the most responses when displayed within a given step in the event planning workflow. The workflow server may then track the users who respond to the paper goods advertisement and determine to continue showing the advertisement to those users, or show other paper goods related advertisements to those users. The workflow server may employ any statistical correlation techniques in analyzing an advertising history and subsequently determining an advertisement to display.

In one embodiment, a workflow server may count and analyze user clicks for purposes of advertisement targeting. In another embodiment, a workflow server may count and analyze time that a user has spent accessing or viewing a given advertisement. In still other embodiments, a workflow server may count and analyze the number of completed sales an advertisement has generated.

In one embodiment, determining an advertisement to be displayed in conjunction with the step in the workflow (step 403) may comprise determining, based on at least one prior input from the identified user, an advertisement to be displayed in conjunction with the step in the workflow. For example, a user may have previously ordered cleaning services through a given workflow, and thus an advertisement for a given cleaning service may be displayed to the user during a subsequent time the user is accessing the workflow. Or, for example, a user may have previously clicked on an advertisement for landscaping services, and thus other advertisements for landscaping services may be displayed during a subsequent workflow session. Or, for example, a user may not have clicked on a previously displayed advertisement for a plumbing supply outlet, and thus the workflow server may determine to not show advertisements for plumbing supplies in subsequent workflow sessions.

In another embodiment, determining an advertisement to be displayed in conjunction with the step in the workflow (step 403) may comprise determining, based on at least one prior input from a second user who previously requested to display the workflow, an advertisement to be displayed in conjunction with the step in the workflow. A workflow server may determine based on one or more previous users' response to an advertisement that the advertisement has a given probability of a successful response when displayed with the workflow. In some embodiments, a workflow server may identify users who share a given occupational role, geographic location, or any other properties or preferences. The workflow server may then display advertisements which received a successful response from one user to users who share one or more of that user's characteristics.

In some embodiments, a workflow server may determine, based on a geographic location identified with the user, an advertisement to be displayed in conjunction with the step in the workflow. The workflow server may identify the geographic location of the user by any means, including registration information, previous inputs into workflows, and IP addresses. In some embodiments, a workflow server may determine an advertisement to display based on a geographic location of a user input. For example, in an event planning workflow, if a user inputs an event location as Toledo, Ohio, the workflow server may then determine to display ads for services and stores in the Toledo area, even if the user is located elsewhere.

After determining an advertisement to be displayed in conjunction with the step in the workflow (step 403), the workflow server may transmit, to the identified user, the requested workflow step and the determined advertisement (step 405). The workflow step may be transmitted using any protocol and via any network. In one embodiment, the workflow step may be transmitted via an HTTP connection to a client operated by the user.

In some embodiments, the workflow server may determine a location for the advertisement within the workflow step based on at least one of the following: previous input from the user, previous input from a second user identified with the given industry, a random factor, or a predetermined ranking of advertisers. For example, the workflow server may determine that the advertisement corresponds to a specific component of the workflow step, and then include the advertisement in a location near the component. Or, for example, the workflow server may determine that a given advertisement has a high success rate, and then display the advertisement in a prominent position. Or, for example, the workflow server may prioritize advertisements based on fees received from advertisers, and then display higher priority advertisements in more prominent locations.

In addition to the techniques for targeting advertisements described above, other techniques may also be used to better target advertisements to users of workflow software. One technique may be to leverage the knowledge of users of the workflow software by having the users recommend advertisers. The users may recommend advertisers that the users have had prior dealings with, or are otherwise affiliated with and know to be interested in the industry serviced by a workflow. This technique may be referred to as community recommended advertising, in that it leverages recommendations from a user community to better deliver targeted, relevant advertisements to that user community.

Figure 5:
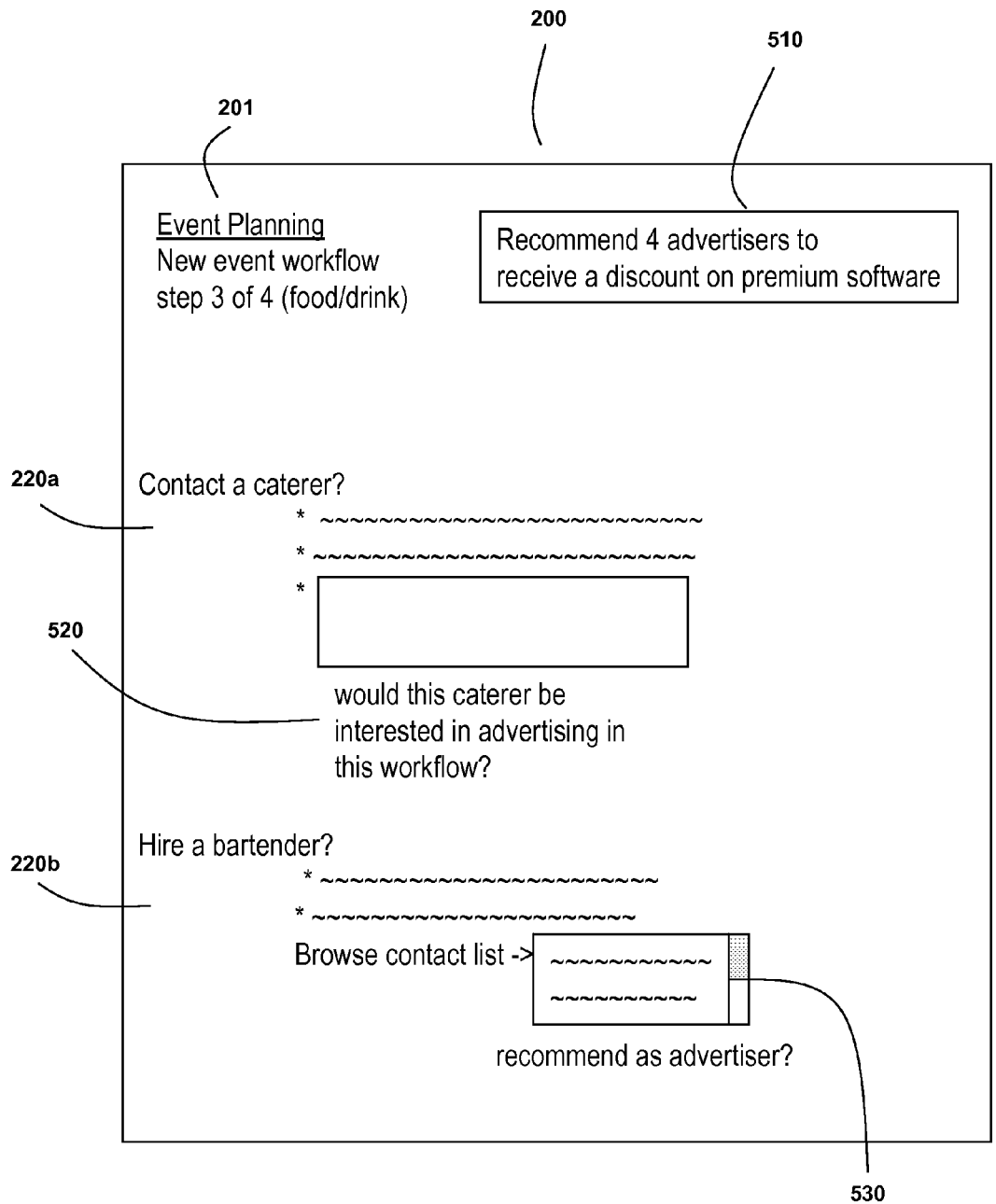
FIG. 5 is an example workflow step enabling community recommended advertising.

Referring now to FIG. 5, an example workflow step enabling community recommended advertising is shown. In brief overview, a workflow step 200 comprises a banner indicating a promotion relating to advertiser recommendations 510. The workflow step also comprises a number of means for users of the workflow to recommend potential advertisers 520, 530.

Still referring to FIG. 5, now in greater detail, a banner 510 may be displayed to users of a workflow indicating a promotion relating to advertiser recommendation. In some embodiments, a promotion relating to advertiser recommendations may be displayed to users at logon, or by any other communication means, such as electronic mail. A promotion relating to advertiser recommendations may comprise any means for generating advertiser recommendations from users. In the example shown, a user recommending a certain number of advertisers may receive a free upgrade to their workflow software. In other embodiments, incentives for advertiser recommendations may include coupons, free offers, or additional workflow software components or functionality. In one embodiment, a user who recommends an advertiser who then advertises on a workflow may be awarded a certain percentage of the advertising revenue from the advertiser.

A workflow may use any means to solicit and provide input for user recommended advertisers. In some embodiments, inputs for user recommended advertisers may be integrated within a workflow step. For example, if a component of a workflow step prompts a user to enter contact information for a business or person relating to the workflow, the workflow step may also comprise a checkbox or other input means for allowing a user to specify that the identified contact may be interested in advertising on the workflow 520. In other embodiments, a workflow step may solicit advertiser recommendations from a user's preexisting contact list 530.

Figure 6:
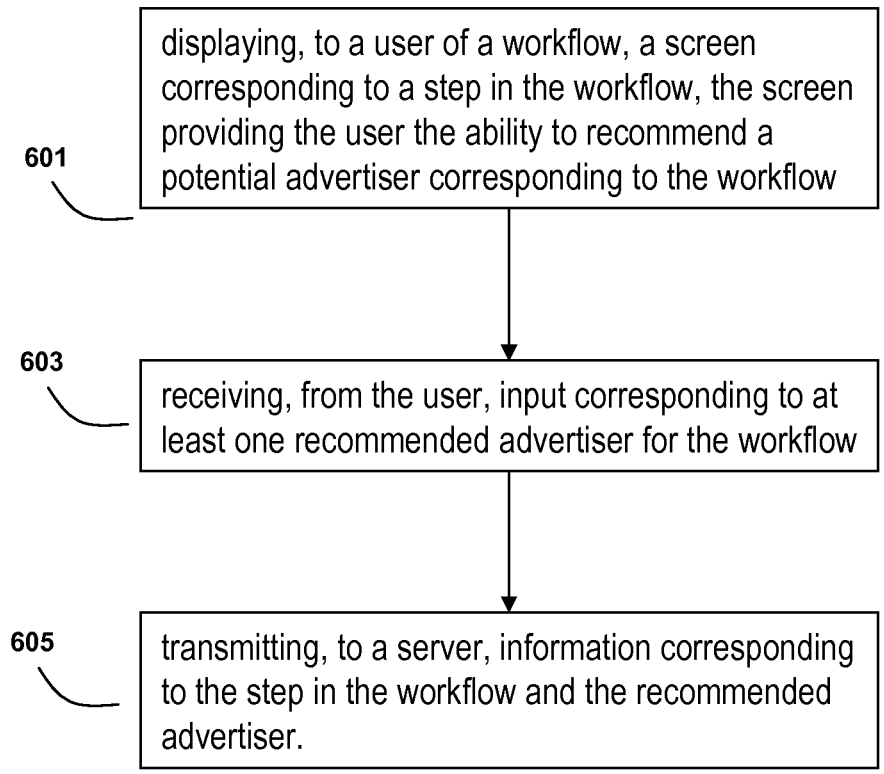
FIG. 6 is a block diagram of a method for allowing targeted advertisements to be recommended by users of workflow software.

Referring now to FIG. 6, a flow diagram of a method for allowing targeted advertisements to be recommended by users of workflow software is shown. In brief overview, the method comprises: displaying, to a user of a workflow, a screen corresponding to a step in the workflow, the screen providing an input for the user to recommend a potential advertiser corresponding to the workflow (step 601); receiving, from the user, input corresponding to at least one recommended advertiser for the workflow (step 603); and transmitting, to a server, information corresponding to the step in the workflow and the recommended advertiser (step 605).

Still referring to FIG. 6, now in greater detail, a method for allowing targeted advertisements to be recommended by users of workflow software comprises: displaying, to a user of a workflow, a screen corresponding to a step in the workflow, the screen providing an input for the user to recommend a potential advertiser corresponding to the workflow (step 601). The workflow step may comprise any workflow step, and may be displayed in any manner.

The input for the user to recommend a potential advertiser corresponding to the workflow may comprise any input described herein. In some embodiments, the input may also collect information relating to a specific workflow step or component that the advertiser may be interested in advertising near. In one embodiment, the input may not inform the user that input results are being used to determine potential advertisers. For example, an input for a user to enter an address to order cleaning supplies may also store that address as a potential advertising contact. In another embodiment, the input may comprise a menu of preselected potential advertisers. In another embodiment, the input may comprise a list of potential vendors, and the user may be asked to rank the products or services of the vendors. In still another embodiment, the input may comprise a prompt asking a user to state whether the user has dealt with a given business previously, and whether the user was satisfied with the business. In still another embodiment, the input may comprise a prompt asking the user to name the best vendor for a given product or service in a given area.

After displaying, to a user of a workflow, a screen corresponding to a step in the workflow, the screen providing an input for the user to recommend a potential advertiser corresponding to the workflow (step 601); a client may receive, from the user, input corresponding to at least one recommended advertiser for the workflow (step 603). The input may be received via any input device. In some embodiments, the input may be stored locally while a user completes a workflow step.

After receiving, from the user, input corresponding to at least one recommended advertiser for the workflow (step 603); a client may transmit, to a server, information corresponding to the step in the workflow and the recommended advertiser (step 605). This information may be transmitted via any network and using any protocol described herein.

In some embodiments, steps 603 and 605 may be performed simultaneously or otherwise overlap. In one embodiment, a user may be prompted to enter a recommended advertiser into a text field, which is in communication with the workflow server. As the user types, the text field may send the input to the workflow server, which then may analyze the partially typed message in order to provide a service, such as auto-completion. For example, the user may type "ab" into a workflow component. The workflow component may transmit the partially typed message to the server, which then may search the user's contact list and identify an entry for "ABC Motors", and then auto-complete the component with the information for ABC motors. The user may then submit the auto-completed form, at which time the information may be transmitted back to the server. A workflow component may use any dynamic input technology, including without limitation Flash, Ajax, Javascript, and Java Applets to provide dynamic features such as these.

Figure 7:
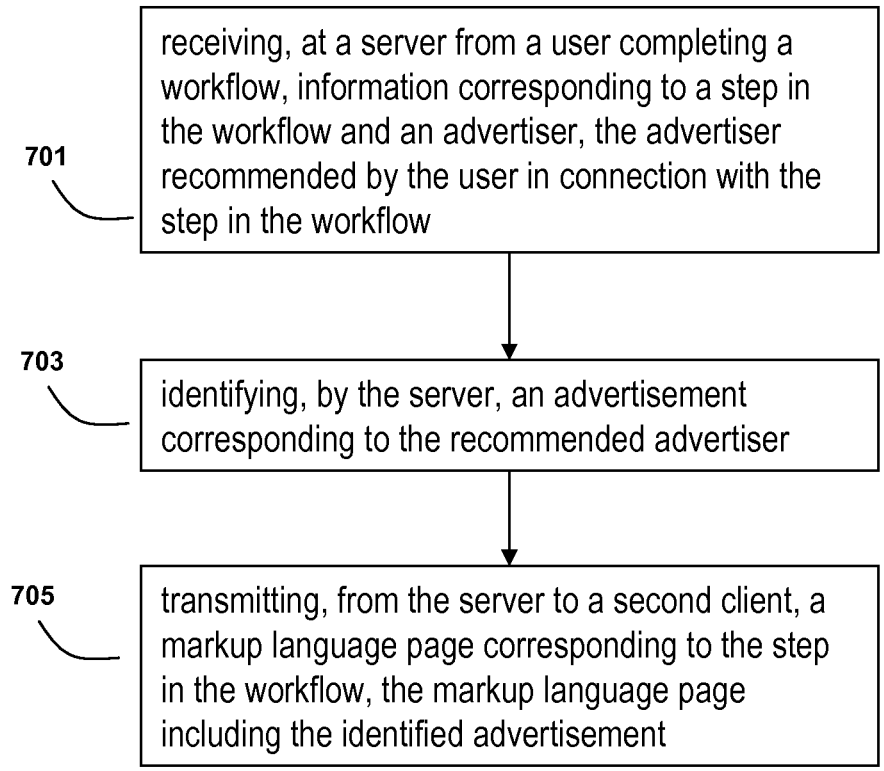
FIG. 7 is a flow diagram of a second method for allowing targeted advertisements to be recommended by users of workflow software and displaying the recommended advertisements to users of the workflow software.

Referring now to FIG. 7, a flow diagram of a second method for allowing targeted advertisements to be recommended by users of workflow software is shown. In brief overview, the method comprises: receiving, at a server from a user completing a workflow, information corresponding to a step in the workflow and an advertiser, the advertiser recommended by the user in connection with the step in the workflow (step 701); identifying, by the server, an advertisement corresponding to the recommended advertiser (step 703); and transmitting, from the server to a second client, a markup language page corresponding to the step in the workflow, the markup language page including the identified advertisement (step 705).

Still referring to FIG. 7, now in greater detail, a second method for allowing targeted advertisements to be recommended by users of workflow software comprises receiving, at a server from a user completing a workflow, information corresponding to a step in the workflow and an advertiser, the advertiser recommended by the user in connection with the step in the workflow (step 701). This information may be received via any network and using any protocol described herein.

In some embodiments, the information may also comprise information relating to a specific workflow step or component that the advertiser may be interested in advertising near.

The server may then identify an advertisement corresponding to the recommended advertiser (step 703). In one embodiment, the server may identify an advertisement from a database of stored advertisements. For example, a workflow step may be displayed to a user along with a menu of potential advertisers for whom the workflow server has ads that may be relevant to the workflow step. The server may then receive the input from the user identifying one or more of the advertisers as relevant to the workflow step. The server may then access a database of advertisements to identify an advertisement corresponding to the identified advertiser.

In one embodiment, the server may also use previous data collected on a particular advertisement to select an ad. For example, an advertiser may have submitted four advertisements for display in conjunction with workflows. The workflow server may determine that one of the ads has a higher rate of responses than the others. If the workflow server then receives a user recommendation to display ads for that advertiser on a given workflow, the workflow server may then select the advertisement that has previously had a high response rate. In another embodiment, the workflow server may select an advertisement that has previously received a high rating from users in a survey or other feedback mechanism.

In some embodiments, the server may contact the advertiser with a request to submit an advertisement. For example, upon receiving a user recommendation that XYZ Corp. should advertise on a property management workflow, a workflow server may send an e-mail to XYZ Corp. informing them of the recommendation, and requesting them to submit advertising materials. In one embodiment, this request may comprise a link to a web site which allows a company to electronically submit advertisements, which are then included in the workflow server's advertisement database. In other embodiments, this request may comprise an instruction to e-mail, call, or otherwise contact personnel responsible for managing the advertising content for the workflows. In still other embodiments, the request may comprise an option for the advertiser to have an advertisement automatically generated by the workflow server. For example, the workflow server may generate an advertisement comprising the name of the advertiser and a text link to the advertiser's web site.

In another embodiment, the workflow software may comprise messages or functionality to enable users to contact and sign up or help sign up potential advertisers. In one embodiment, users may be encouraged to contact potential advertisers and be provided with a telephone number for them or the potential advertisers to call with advertiser leads. In another embodiment, the users may be encouraged to use a previously known telephone number, e-mail address, or URL for purposes of signing-up potential advertisers. In another embodiment, users may be provided with a link or e-mail address to give to potential advertisers, which will then connect the potential advertisers to a sign up procedure for displaying advertisements within the workflow software. In some embodiments, this link may comprise information about the user recommending an advertiser. For example, a user may be provided with a link incorporating a user identifier corresponding to the user. If a potential advertiser then uses the link to sign up for displaying advertisements, the workflow server may recognize the user identifier, and distribute a reward, bonus, or other incentive to the user accordingly. The workflow server may also then mark any advertisements submitted by the advertiser using the link as recommended by the user, and use this information in determining future workflows in which to display the advertisements.

After identifying, by the server, an advertisement corresponding to the recommended advertiser (step 703); the server may then transmit, to a second client, a markup language page corresponding to the step in the workflow, the markup language page including the identified advertisement (step 705). The advertisement may be displayed within the page according to any of the embodiments described herein. In some embodiments, information relating to identifying the advertisement (step 703) may be displayed along with the advertisement. For example, an advertisement may be displayed along with text stating "98% of workflow software users who used this advertiser were happy with the results," or "This advertiser was given the highest quality rating in a survey of users of this workflow," or "This advertiser was identified by someone in your geographic area as a high-quality business."

Now referring to FIG. 8, a block diagram of an example workflow step with input data is shown. In brief overview, a web browser 801 is displayed in a computer desktop 800. The web browser displays a web page 802 containing a property management workflow form. The form has an input field 803 with data a user has filled in, and a submit button 805 for a user to submit the form and proceed to the next step in the workflow.

Figure 9:
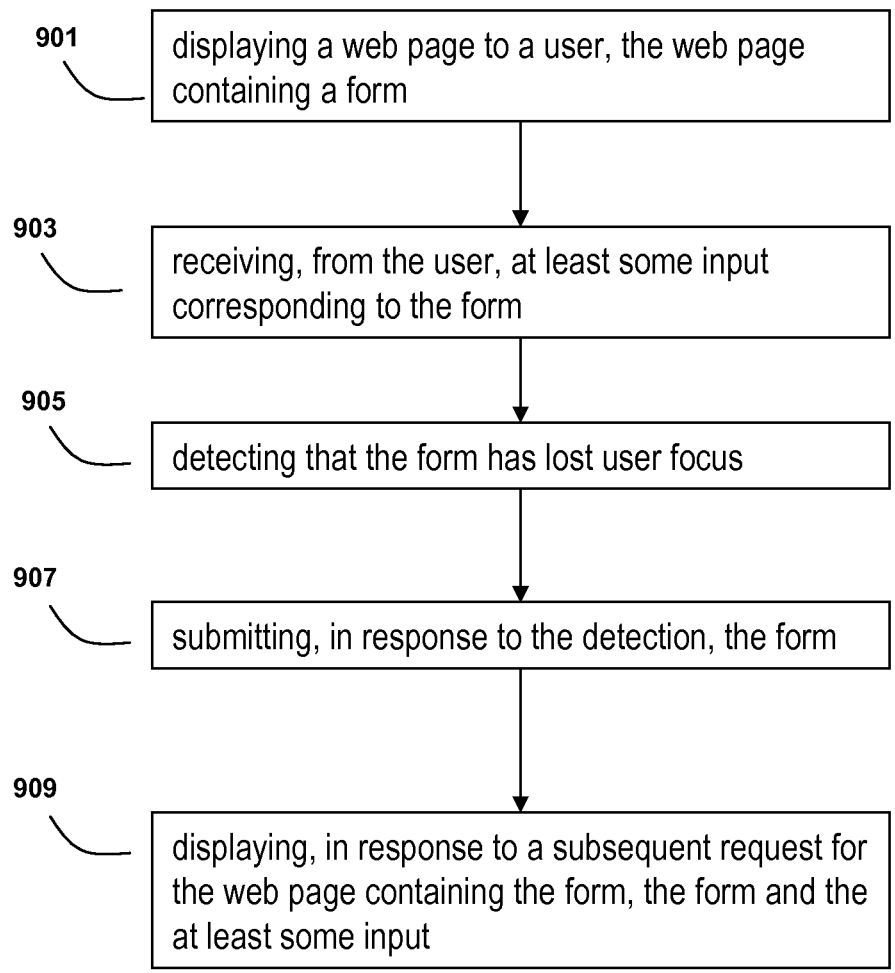
FIG. 9 is a flow diagram of one embodiment of a method for automatically submitting data entered into a web page in the event a user shifts focus away from the form.

Now referring to FIG. 9, a flow diagram of one embodiment of a method for automatically submitting data entered into a web page in the event a user shifts focus away from the form is shown. In brief overview, the method includes displaying a web page to a user, the web page containing a form (step 901); receiving, from the user, at least some input corresponding to the form (step 903); detecting that the form has lost user focus (step 905); and submitting, in response to the detection, the form (step 907). The method may also include displaying, in response to a subsequent request for the web page containing the form, the form and the at least some input (step 909). The method shown may be performed by any computing device or combination of devices, including without limitation personal computers and mobile devices.

Still referring to FIG. 9, now in greater detail, any web page containing a form may be displayed to a user (step 901). The web page may be displayed on any device. In some embodiments, the web page may comprise a workflow step 802. In other embodiments, the web page may comprise a workflow report. In other embodiments, the web page may comprise an input form used to generate workflow reports. In some embodiments, the web page may comprise a plurality of forms. In some embodiments, a plurality of web pages may be simultaneously displayed to a user. In these embodiments, the web pages may be displayed in any fashion, including separate windows and separate tabs. In some embodiments, the web page may be displayed within a web browser 801 on a computer desktop 800. In these embodiments, any other applications may be executing simultaneously with the web browser.

Input corresponding to the form may be received from the user in any manner (step 903). In some embodiments, the user may enter text into a text field, such as the text field 803. In other embodiments, a user may make one or more selections and/or upload one or more files. the input may be received by any input element or elements capable of being displayed on a web page, including without limitation text fields, menus, sliders, dialog boxes, buttons, radio buttons, and/or applets.

After input has been entered, any method may be used detecting that the form has lost user focus (step 905). In some embodiments, a script or applet embedded in the web page may detect events indicating a loss of user focus on the form. For example, a Javascript script may detect when the user has clicked on an element of the web page outside of the form, such as an advertisement or external link. Or for example, a Java applet may use event handlers to monitor the position of the mouse cursor, and detect when the mouse cursor either leaves or is clicked outside the form. Events indicating a loss of user focus may include, without limitation, indications that a browser window containing the form is closing, indications that the web browser process containing the form is terminating, user keystrokes or mouse input into areas outside of the form, user keystrokes or mouse input into other applications, indications that the computer is shutting down, and indications that the web browser window has lost focus, is minimized, or hidden. All of these events may be detected in any manner. For example, the code below may be used detect that a window is closing.

```
<script type='text/javascript'>
    window.onbeforeunload = function( ) {
        if (window.event.clientY < 0 && (window.event.clientX >
                (document.documentElement.clientWidth – 5) ||
    window.event.clientX < 15)) {
            // the window is closing, perform autosave
        }
    }
</script>
```

After the loss of focus is detected, the form may be submitted in any manner (step 907). In some embodiments, the form may be automatically submitted by the script and/or applet that detected the loss of focus. For example, a javascript script embedded in the form itself may submit the form in response to detecting that the form has lost focus. In some embodiments, any received input on the form may not be verified prior to the auto-submission. For example, a form may require entry of United States Zip Code. Ordinarily when a user hits a submit button, the form may confirm the zip code contains only the numbers 0-9, and prompt the user to correct the zip code if other characters are present. However, in the case of a submission as a result of lost focus, the form may forgo the verification step. This may allow faster form submission and may allow a user to change focus away from a form without being prompted to correct incomplete or incorrect data in a form.

In some embodiments, data that is automatically submitted may also be treated differently by a receiving database. For example, automatically submitted data may include data that is of different types than data expected by a database. Again using the above example, a "zip code" field of a database may be configured to store integer numbers, but may receive an input of "3456t" which was entered by a user and then automatically submitted. In these cases, the database and/or a database interface program may create additional storage types and/or pointers to accommodate the incompatible data.

In some embodiments, in addition or in lieu of automatically submitting in response to a detection of lost focus, data may be periodically automatically submitted. For example, data may be automatically submitted every 30 seconds.

Submitting the form may comprise any method of transmitting the form contents, including the input, to a server. In some embodiments, submission may be done using a HTTP POST transmission. In some embodiments, submission may be done using the HTML form.submit( ) method. In some embodiments, a submission may be done asynchronously using Ajax techniques.

In some embodiments, an indication may be transmitted to the server that the submission was triggered by a loss of focus, rather than at the request of the user. This may indicate to the server that any data entered into the form is only temporary, and may prompt the server to delay processing any data contained in the form until a normal submission of the form is received.

A server may store the data submitted in the form in any manner, and for any period of time. In some embodiments, the server may associate the data with a particular user, computer, and/or web browser. In some embodiments, the server may associate the date with a particular form field or a key associated with a form field. For example, if a user begins typing in a tenant name, and then is interrupted the current value of the "tenant" field in the form may be automatically submitted, along with information that the value corresponds to the "tenant" field.

The server may then transmit the previously submitted data in response to a request for the web page from the user, computer and/or web browser that submitted the data. In this manner, a user working on a form who accidentally closes their browser window, for example, may recover the data that they had input into the form once they navigate back to that web page.

In some embodiments, upon a user returning to a web page for which data was automatically submitted, the user may be presented with the option of loading the automatically submitted data into the page. For example, when the user loads the page, a "drafts" icon or text may be displayed, which allows the user to access a partially completed version of the form that was automatically submitted. In some embodiments, a user may be able to select from multiple automatically submitted forms to load.

Although the automatic submission systems and techniques have been described above in the context of web pages, in some embodiments, the above techniques may be used for web applications. For example, web applications may be developed which execute on a client independently of a web browser. Examples of technologies which may be used to develop web applications include without limitation, SILVERLIGHT, published by Microsoft Corp., and AIR and FLASH, each published by Adobe, Inc. In these embodiments, data input into such a web application may be automatically submitted to a server upon a loss of focus or any of the other events described above. The web application may then load the automatically submitted data upon the user restarting the web application.

While the invention has been particularly shown and described with reference to specific preferred embodiments, it should be understood by those skilled in the art that various changes in form and detail may be made therein without departing from the spirit and scope of the invention as defined by the appended claims.

We claim:

1. A method for automatically submitting input entered into a form in a web page for a law firm workflow in the event a user shifts focus away from the form, the method comprising:
   (a) transmitting, from a server, a web page containing a form for a legal workflow to a user;
   (b) receiving, from the user, first input requested by the form;
   (c) detecting that the form has lost user focus while the web page remains open, said detecting comprising detecting one of:
       when the user has clicked on an element of the web page outside of the form;
       when the mouse cursor either leaves or is clicked outside the form;
       when the user keystrokes or mouse input into areas outside the form;
       when the user keystrokes or mouse input into other applications;
       when the web browser window has lost focus, is minimized, or is hidden;
   (d) submitting to the server, in response to the detection, the first input and an indication that the submission was triggered by a loss of focus;
   (e) detecting that the form in the open web page has regained user focus; and
   (f) transmitting, from the server, the web page containing the form and the first input.

2. The method of claim 1, wherein the web page transmitted from the server in step (f) further contains an indicator that the first input was automatically submitted.

3. The method of claim 1, wherein step (b) comprises transmitting the web page to a mobile device.

4. The method of claim 1, wherein the web page is displayed on a mobile device.

5. The method of claim 1, wherein step (c) comprises detecting one of:
   input not corresponding to the form;
   a position of a mouse cursor not corresponding to the form; and
   a mouse click outside the form.

6. The method of claim 1, wherein step (c) comprises detecting that the form has lost user focus via a script or an applet embedded in the web page.

7. The method of claim 1, wherein step (c) comprises detecting user input in one of:
   an area outside of the web page;
   an area inside the web page but outside of the form.

8. The method of claim 1, wherein
   step (e) comprises detecting a user request for the web page; and
   step (f) further comprises
      reloading, in response to the user request for the web page, the web page, and
      displaying the first input within the form contained in the reloaded web page.

9. The method of claim 1, wherein the first input submitted in step (d) includes incompatible data and the server accommodates the incompatible data.

10. The method of claim 1, further comprising:
    (g) receiving, from the user, second input requested by the form; and
    (h) submitting the second input to the server.

11. A computer system for receiving input entered into a form in a web page for a law firm workflow automatically transmitted in the event a user shifts focus away from the form, the system comprising:
    a data storage device;
    a data communication link; and
    a workflow server comprising at least one processor, the server configured to:
       transmit, for display at a user computing device, data for a web page containing a form for a legal workflow;
       receive, from the user computing device, submission of first input requested by the form and an indication that the submission was triggered by a loss of focus, wherein the first input is transmitted from the user computing device responsive to a detection that the form has lost user focus while the web page remains open, the detection comprising one of:
          (a) detecting when the user has clicked on an element of the web page outside of the form;
          (b) detecting when the mouse cursor either leaves or is clicked outside the form;
          (c) detecting when the user keystrokes or mouse input into areas outside the form;
          (d) detecting when the user keystrokes or mouse input into other applications; and
          (e) detecting when the web browser window has lost focus, is minimized or hidden;
       store, by the data storage device, the received first input;
       receive, from the user computing device, an indication that the open web page has regained user focus; and transmit, responsive to receiving the indication that the open web page has regained user focus, data for the web page containing the form and the stored first input.

12. The system of claim 11, wherein the web page transmitted by the server responsive to receiving the indication that the open web page has regained user focus further contains an indicator that the first input was automatically submitted.

13. The system of claim 11, wherein the user computing device is a mobile device.

14. The system of claim 11, wherein the server is configured to transmit data for the web page containing a form for a legal workflow for display at a mobile computing device.

15. The system of claim 11, wherein step (c) comprises detecting one of:
   user input not corresponding to the form;
   a position of a mouse cursor not corresponding to the form; and
   a mouse click outside the form.

16. The system of claim 11, wherein the detection that the form has lost user focus via a script or an applet embedded in the web page.

17. The system of claim 11, the detection that the form has lost user focus comprises detecting user input in one of:
   an area outside of the web page;
   an area inside the web page but outside of the form.

18. The system of claim 11, wherein
   the server receives a user request for the web page,
   the server transmits, in response to the user request for the web page, data for the web page and the first input for display in the form contained in the web page.

19. The system of claim 11, wherein the first data received by the server includes incompatible data and the data storage device accommodates the incompatible data.

20. The system of claim 19, wherein the data storage device accommodates the incompatible data by creating an a storage type to accommodate the incompatible data.

* * * * *